United States Patent
Proulx et al.

(10) Patent No.: US 6,490,777 B1
(45) Date of Patent: Dec. 10, 2002

(54) METHODS FOR PRODUCING SOLID SUBASSEMBLIES OF FLUIDIC PARTICULATE MATTER

(75) Inventors: Andrew G. Proulx, Concord, MA (US); George M. Carmichael, Rindge, NH (US)

(73) Assignee: Millipore Corporation, Bedford, MA (US)

(*) Notice: Subject to any disclaimer, the term of this patent is extended or adjusted under 35 U.S.C. 154(b) by 0 days.

(21) Appl. No.: 09/508,412

(22) PCT Filed: Oct. 8, 1998

(86) PCT No.: PCT/US98/21211

§ 371 (c)(1),
(2), (4) Date: Mar. 10, 2000

(87) PCT Pub. No.: WO99/19053

PCT Pub. Date: Apr. 22, 1999

Related U.S. Application Data

(60) Provisional application No. 60/061,438, filed on Oct. 9, 1997.

(51) Int. Cl.⁷ .................................................. B21B 1/46
(52) U.S. Cl. ..................... 29/527.1; 264/71; 264/299; 62/66
(58) Field of Search ................... 29/527.1, DIG. 29; 264/28, 71, 299; 62/66

(56) References Cited

U.S. PATENT DOCUMENTS

| | | | | |
|---|---|---|---|---|
| 2,815,320 A | * | 12/1957 | Kollsman | |
| 4,585,583 A | * | 4/1986 | Roberson et al. | |
| 4,747,929 A | * | 5/1988 | Siu et al. | |
| 5,024,764 A | * | 6/1991 | Holler | |
| 5,072,770 A | | 12/1991 | Yodice | |
| 5,120,416 A | * | 6/1992 | Parsi et al. | |
| 5,593,563 A | * | 1/1997 | Denoncourt et al. | |
| 5,622,997 A | * | 4/1997 | Tennison et al. | |
| 5,681,438 A | * | 10/1997 | Proulx | |

FOREIGN PATENT DOCUMENTS

| | | |
|---|---|---|
| GB | 942762 | 5/1961 |
| JP | 09155838 | 6/1997 |
| JP | 10-129382 | 11/1999 |

OTHER PUBLICATIONS

Abstract of JP 63247004 A, 1988.

* cited by examiner

Primary Examiner—David P. Bryant
(74) Attorney, Agent, or Firm—John Dana Hubbard

(57) ABSTRACT

The present invention provides methods and devices for producing a subassembly for devices designed to receive particulate matter in a compartment of predetermined shape.

6 Claims, 6 Drawing Sheets

METHODS FOR PRODUCING SOLID SUBASSEMBLIES OF FLUIDIC PARTICULATE MATTER

This application claims the benefit of Provisional Application No. 60/061,438, filed Oct. 9, 1997.

BACKGROUND OF THE INVENTION

The present invention relates to novel methods and devices for producing solid subassemblies of fluidic particulate matter by creating a slurry that can be frozen. Preferably this invention allows the production of subassemblies of solid media to be used for manufacturing electrodeionization devices.

The term "electrodeionization" refers to a process of reducing the concentration of ions in a liquid, with the liquid generally being water. This process, as opposed to other types of processes that provide the same result (distillation, electrodialysis, reverse osmosis, liquid chromatography, membrane filtration and ion exchange) is characterized by an ion exchange material, anion and cationic membranes in which the resin is placed between, and electrodes for providing direct current.

For purposes of this invention, the term "media" is defined as particulate matter with fluid characteristics that is used in connection with fluid purification or separation. Such media include, but are not limited to, ion exchange resins, both singular and mixed, activated carbon beads, chromatography beads and related materials.

For purposes of this invention, the term "particulate matter" will mean any solid, granular material, including powders and other finely divided solids, that have fluid characteristics.

The use of ion exchange resins for the ion exchange material for electrodeionization is well known in the art. Kollsman, U.S. Pat. No. 2,815,320, describes the use of macroporous beads formed of ion exchange resins positioned between the anionic and cationic membranes. Kollsman teaches that these ion exchange resin beads act as a path for ion transfer and also serves as an increased conductivity bridge between the membrane for the movement of ions.

Further development in the art has resulted in additional types of media being used in electrodeionization devices. Denoncourt, et al., U.S. Pat. No. 5,593,563, disclose the use of electron conductive particles in the cathode compartment of an electrodeionization device. Unfortunately, for either type of media, the prior art does not provide an elegant and cost effective manner of loading the media into the compartments of electrodeionization devices.

Spacers, filled by way of the present invention, were first disclosed in Siu, et al., U.S. Pat. No. 4,747,929. The patent provides spacers that retain ion exchange media while promoting a substantially uniform flow of liquid through the compartments created by spacers being bonded to each other.

The ELIX® water. purificationsystem Millipore Corporation, Bedford, Mass.) includes electrodeionization device. Prior to the conception and reduction to practice of the present invention, the production of the device, and specifically the fabrication of the resin-filled cell pairs and cell stacks, was quite labor intensive.

For producing a prior art resin filled cell pair, a conditioned anion membrane is affixed to one side of a spacer. Spacers could consist of any shape but the spacers used for producing the ELIXelectrodeionization device in the unit are rectangular in shape and are characterized by a rectangular orifice contained therein.

With the addition of the membrane, a trough-like channel is formed which can receive media. The channel is then filled with resin by hand packing the resin in the channel with a stainless steel spatula. Then, running the stainless steel spatula across the top surface of the dilute spacer, the excess resin is removed. The worker must then inspect the resin-filled spacer to insure that the channel is uniformly filled. Any resin remaining on the surface of the spacer must then be removed. The exposed resin-filled channel is then covered by a conditioned cation membrane, which is fixed to the body of the spacer in a manner that does not allow resin to leak out. The worker must then re-inspect the filled cell and remove any excess resin from its external surfaces.

Recently, new methods of manufacturing electrodeionization devices have been disclosed by A. Proulx, U.S. application Ser. No. 08/656,138, filed May 31, 1996 and issued on Oct. 28, 1997 as U.S. Pat. No. 5,681,438. Proulx discloses improvements to the manufacturing process of electrodeionization devices but, despite these improvements, the difficulties with hand packing resin remain.

Using the method disclosed by Proulx, the resin spacers are packed with resin as the device is built. This requires the module to sit inside a welding machine and the operator to weld each spacer as it is added to the stack. Because of the time needed to hand fill the spacer channels while the modules are in the welder, the welder is idle for a significant time period during the process. This process prevents more than one operator from using a welder at a time, or at a minimum, prevents the efficient use of such a welder. The ability of two operators to share a welder would dramatically decrease the cost of producing the device.

Previous methods used to fill the spacer channels included a slurry-fill technique. The resin was mixed with an excess amount of water and delivered to the channel from a pressure vessel. To insure proper settling of the resin, excess water was continuously removed from the spacer channel. This method proved to be undesirable for many of the reasons provided above, but also required the capital expense of the pressure vessels to deliver the slurry as well vacuum devices for removing the excess water.

There are additional means of preparing molded ion exchange resin. Tennison et al., U.S. Pat. No. 5,622,997, issued Apr. 22, 1997, discloses a process for preparing a molded exchange resin structure from ion exchange resin precursor. In this process, the precursor resin is compressed into shape. Then, the functional groups are chemically bonded to each other. In the preferred embodiment, this process required a hydraulic press. A more elegant, cost-effective method which uses standard media is desirable.

A related method of solidifying ion exchange media is also disclosed by Roberson et al., U.S. Pat. No. 4,585,583. This method, however, is directed to solidifying spent ion exchange media, not media intended for ion exchange.

An additional method for introducing and removing ion exchange resign and other particulate matter from an electrodeionization device is disclosed in U.S. Pat. No. 5,120,416 issued to Parsi et al. This patent disclosed an apparatus for pumping a slurry into a pre-assembled electrodeionization stack.

However, none of these methods allow for producing an electrodeionization device quickly and with a precise volume of ion exchange media. Accordingly, it would be desirable to have a novel method of preparing and packing media into predetermined shapes. It would further be preferable to have a novel method of preparing and packing media into predetermined shapes, which makes assembly of an electrodeionization device faster and with more efficient use of capital equipment.

SUMMARY OF THE INVENTION

The present invention provides a novel method of solidifying particulate materials, and specifically media for use in manufacturing processes. The present invention further provides methods of manufacturing electrodeionization device subassemblies of spacer/media for electrodeionization compartments. The compartment subassemblies result in fewer man-hours needed to manufacture the modules and allow for a more efficient use of capital equipment. The present invention provides a method of producing media in a predetermined, solid shape from media and liquid, the method comprising inserting media into a pre-selected mold; adding liquid to the media to create a slurry; and placing the filled mold into an environment that will freeze the liquid.

An advantage of the present invention is that media to be used in the electrodeionization manufacturing process is placed in a slurry that is then frozen. The solid object that results from the method improves handling of media during the manufacturing process. Moreover, the chance of particulate media getting on membrane or spacer bond areas is minimized. Such excess resin can reside on the spacer where the membrane is bonded and can contribute to product failures. In addition, when frozen, the media does not shift or change distribution while the electrodeionization module is manufactured. Lastly, decoupling of the filling of electrodeionization compartments from the balance of the manufacturing process improves the efficiency of manufacturing these devices.

The present invention also provides a method of uniformly distributing the packing density of media used in manufacturing electrodeionization devices, the method comprising inserting media into a receptacle designed to hold such media; inserting an amount of liquid effective to level the upper surface of the media; and vibrating the receptacle with a vibrating device for a time sufficient to distribute the media such that its packing density is substantially uniform.

The principal prior art methods of spreading media in electrodeionization devices were hand spreading and delivery via a pumping and piping system. The present invention of vibrating the media increases the packing density of the media. Moreover, the packing density of vibrated units as opposed to hand packed units have greater consistency. One of the problems with hand packing media in spacers is that there is significant variability from operator to operator. The present invention substantially limits such variability.

The present invention further improves the manufacturing process. First the media can be formed in a cavity or mold of predetermined shape. Accordingly, the dimensions and flatness of the slurry brick transferred to a spacer can be made with closer tolerances. Alternatively, the spacer can be filled with a pattern of a number of slurry bricks, that is, at least two, rather than merely one. For example, on larger units, it may be appropriate to use a number of bricks that can be laid in a pattern in the spacer channel, rather than a single brick, to fill it. Since the brick thaws after assembly of the electrodeionization devices, use of such multiple brick assemblies would not affect packing density.

The use of frozen media rather than hand packed media allows the manufacturing process of the electrodeionization modules to be altered in a manner that improves the efficiency of the process. With the hand packed media, the spacer was filled, stored then welded together at final assembly. With use of the frozen media, the spacer is not handled with resin inside of it, therefore it easier to handle and store.

The present invention further provides a method of manufacturing an electrodeionization module, the method comprising preparing a slurry including water and ion exchange resin; pouring the resin slurry into a spacer channel mold; freezing the resin slurry until solid; fixing a first spacer plate onto an end cap, wherein the spacer plate has a channel; inserting frozen resin slurry into the spacer plate channel; and fixing an end cap on the end opposite the first end cap. In a preferred embodiment, the method of the present invention further comprises preparing a slurry including water and activated carbon beads; pouring the carbon slurry into a spacer channel mold; freezing the carbon slurry until solid; fixing a final spacer plate onto the last resin-containing spacer plate fixed to the module; inserting frozen carbon slurry into the channel of the final spacer plate; and fixing a second end cap to the final spacer plate.

The present invention also provides a receptacle or mold for freezing a slurry including media and liquid. Such a mold would be comprised of materials that can withstand freezing the liquid and have walls and a base configured such that the internal shape of the mold is substantially similar to a compartment designed to receive media. In a preferred embodiment, the bottom, internal surface of the mold would be uneven. In a still more preferred embodiment, the bottom, internal surface of the mold would be scored. In a preferred embodiment, the scoring would be substantially parallel.

The present invention also provides a method of manufacturing a subassembly for a device that contains particulate matter in a compartment, a method comprising: preparing a slurry including liquid and the particulate matter; transferring the slurry into a mold configured to produce a slurry brick that is substantially equivalent to a space in the compartment designed to receive the particulate matter; freezing the slurry until a slurry brick is created; and transferring the slurry brick into the compartment. Preferably, the method further comprises vibrating the slurry-filled mold prior to freezing the slurry to increase the packing density of the media as well as consistently distribute the particulate matter in the slurry.

DESCRIPTION OF THE SPECIFIC EMBODIMENTS

Figure 1:
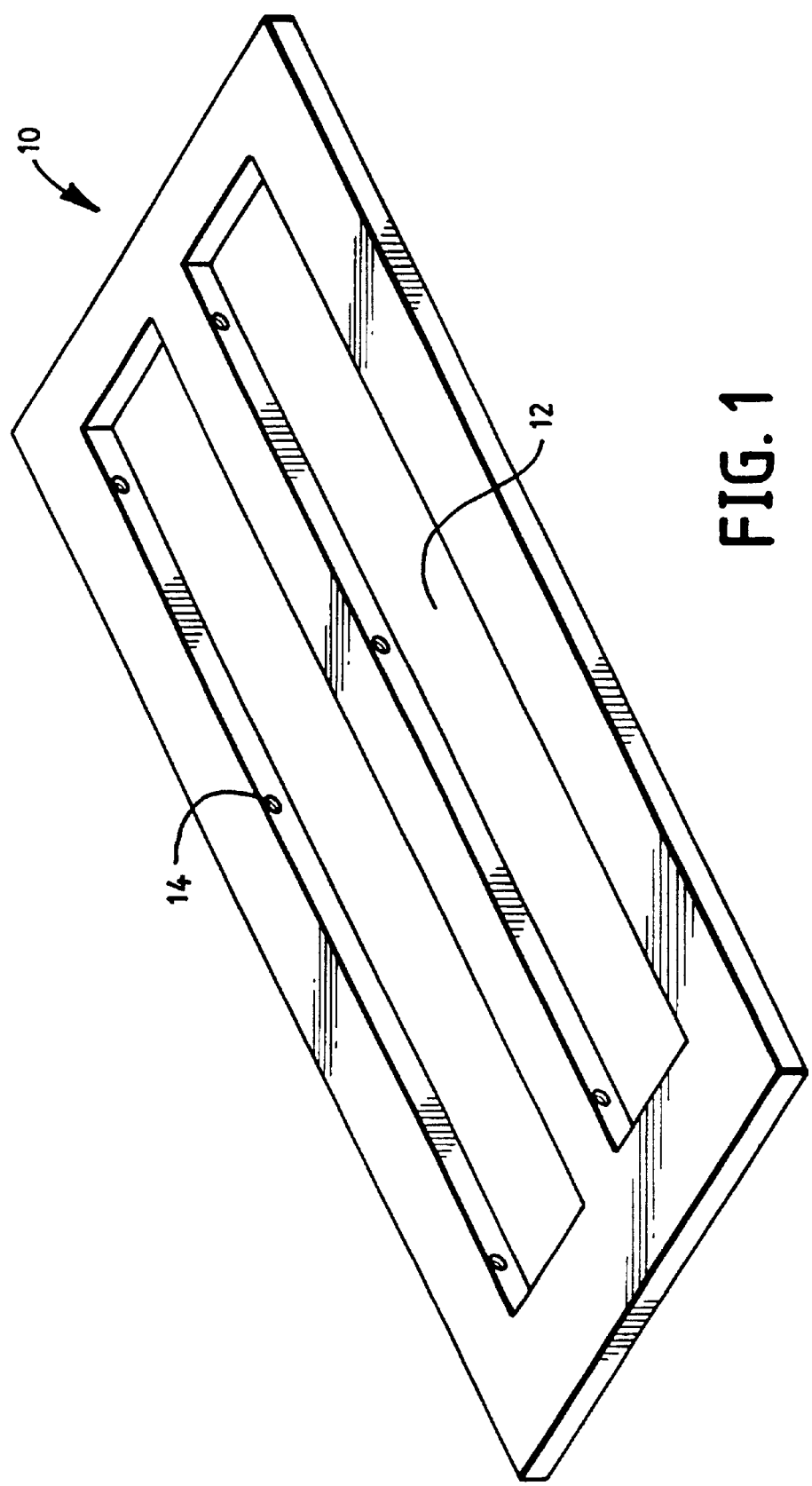
FIG. 1 illustrates a tray for freezing media.

The present invention provides improvements to the process of manufacturing subassemblies of particulate matter for insertion into compartments generally and specifically electrodeionization devices. As set forth above, it provides a method of producing media in a predetermined, solid shape from media and liquid, the method comprising inserting media into a pre-selected mold; adding liquid to the media to create a slurry; and placing the filled mold into an environment that will solidify the liquid. It is contemplated that freezing be used to solidify the liquid. For freezing the slurry, the proper environment shall be one that can freeze the liquid of the slurry, thereby trapping the solid particles of media in the frozen liquid.

For purposes of this invention, the term "slurry brick" shall be defined as a solid, composite structure of frozen liquid and media, the media being suspended in the frozen liquid. This term, however, is not to be construed as limiting the shape of solid objects produced by the present invention.

In a preferred embodiment of this invention, the media and liquid are mixed to create slurry prior to being inserted into the mold. Preferably, the liquid is water, but other liquids and solutions that have a suitable freezing temperature are contemplated. Certainly, any such liquid must not have a derogatory effect on the particulate matter, media or resin material that is to be frozen in it and must have a freezing temperature suitable to make its use commercially justifiable. Is is understood that for certain applications it will be preferable to remove the liquid from the compartment after the slurry brick has thawed.

In another embodiment of the present invention, the method includes mechanically distributing the slurry in the mold. Devices contemplated for mechanically distributing the slurry include a steel spatula, trowel or similar device. The preferred device for distributing the slurry in the mold is a vibration table. The methods of the present invention further contemplate the use of combinations of such devices. For purposes of this invention, the phrase "packing density" is defined as the density of the media in the mold or channel spacer. One object of the present invention is to produce a slurry that has a uniform packing density prior to freezing. Then the packing density of the particulate matter or media, once it is thawed out, will be uniform throughout the channel spacer or other compartment.

It is anticipated that the slurry brick can be shaped to fit the channel of the compartment or spacer of interest. That is, the brick can be shaved, grounded or cut to provide the shape of interest. However, it is preferred that such alteration not be necessary. It is preferred that the internal dimensions of the mold are substantially equivalent to those of a spacer channel such that the brick produced thereby would fit into the spacer channel The present invention contemplates various types of media, but a preferred media is ion exchange resin. Preferably, the ion exchange resin used is a mixture of anion and cation resin. Preferably, the mixture is in a ratio of 70 to 30. The method of the present invention further contemplates media comprised of activated carbon beads.

The present invention uses liquid to transport the media to the mold. It is contemplated that additional liquid shall be added to the mold to facilitate distribution of the slurry before and during mechanical distribution. To prevent the loss of media over the rim of the mold, it is contemplated that the method of the present invention, in a preferred embodiment, shall further comprise aspirating excess liquid from the surface of the slurry.

The present invention provides a method of increasing and uniformly distributing the packing density of media used in manufacturing electrodeionization devices, the method comprising inserting media into a receptacle designed to hold such media; and vibrating the receptacle with a vibrating device for a time sufficient to distribute the media such that its packing density is substantially uniform. In a preferred embodiment of the present invention, an amount of liquid effective to level the surface of the media in the mold is added. In another embodiment, liquid is added before and during the period in which the slurry is mechanically distributed. In another embodiment, liquid is added to the media to create a slurry and the slurry is added to the receptacle.

The method of the present invention provides for vibrating the mold on a vibration table. The time for vibration can vary with the frequency with which the table vibrates but the table should be vibrated for a time period in the range from about 0.1 minutes to about 20 minutes. In a preferred embodiment of the present invention, the time period for vibrating the mold is in the range from about 0.5 minutes to about 5 minutes. In another preferred range, the time period for vibrating the mold is in the range from about 0.1 to about 0.3 minutes. In another preferred embodiment of this method, the time period is about 0.08 minutes; that is, about 5 seconds.

In order to practice the method of the present invention, a new and novel tray or mold was designed. The present invention provides a mold for freezing a slurry including media and liquid, the mold comprised of materials that can withstand temperatures below the freezing temperature of the liquid and having walls and a base configured such that the internal shape of the mold is substantially similar to a spacer channel. To facilitate aspiration of liquid from the mold, the present invention provides that the mold preferably have at least one aperture at or near its upper perimeter.

The present invention also provides a method of manufacturing an electrodeionization module, the method comprising preparing a slurry including water and ion exchange resin; pouring the resin slurry into a spacer channel mold; freezing the resin slurry until solid; fixing a first spacer plate onto an end cap, wherein the spacer plate has a channel; inserting frozen resin slurry into the spacer plate channel; and fixing an end cap on the end opposite the first end cap. For this embodiment, it is preferable that the spacer plates and the end caps are fixed to each other by welding but other means, such as gluing, epoxy bonding and the like are contemplated. For purposes of this invention, the phrase "end cap" means an electrode and preferably an anode or cathode. In a preferred embodiment, an "end cap" includes the housing fitted with electric connections between the electrode and an external power source and fluidic connections between the electrodeionization modules and water inlets water inlets or outlets.

In a preferred embodiment of the present invention, the method further comprises preparing a slurry including water and activated carbon beads; pouring the carbon slurry into a spacer channel mold; freezing the carbon slurry until solid; fixing a final spacer plate onto the last resin-containing spacer plate fixed to the module; inserting frozen carbon slurry into the channel of the final spacer plate; and fixing a second end cap to the final spacer plate. In a preferred embodiment of the present invention, the method comprises the step of vibrating the mold prior to freezing the slurry. It is preferable to fix the various parts of the device via welding, but other means of fixing are contemplated such as chemically bonding, bolting, screwing and the like In referring to FIG. 1, the figure provides a mold 10 in which media can be packed and either frozen or vibrated prior to freezing. The media would be added to the channel 12 and leveled by an operator. If the media were to be vibrated first, it would be vibrated for a period of time.

Liquid could be added before, during or after vibration. The mold 10 provides a plurality of holes 14 that can be connected to a vacuum hose. Preferably, the holes are smaller than the individual beads of media being frozen. Such vacuum is used to aspirate excess liquid from the filled channel 12.

While the spacer mold is a preferred manner of producing the slurry bricks of the present invention, it is recognized that slurry bricks can be produced by extruding media and freezing it as it exits the extruder. The present invention includes other devices that can freeze and shape media.

Figure 2:
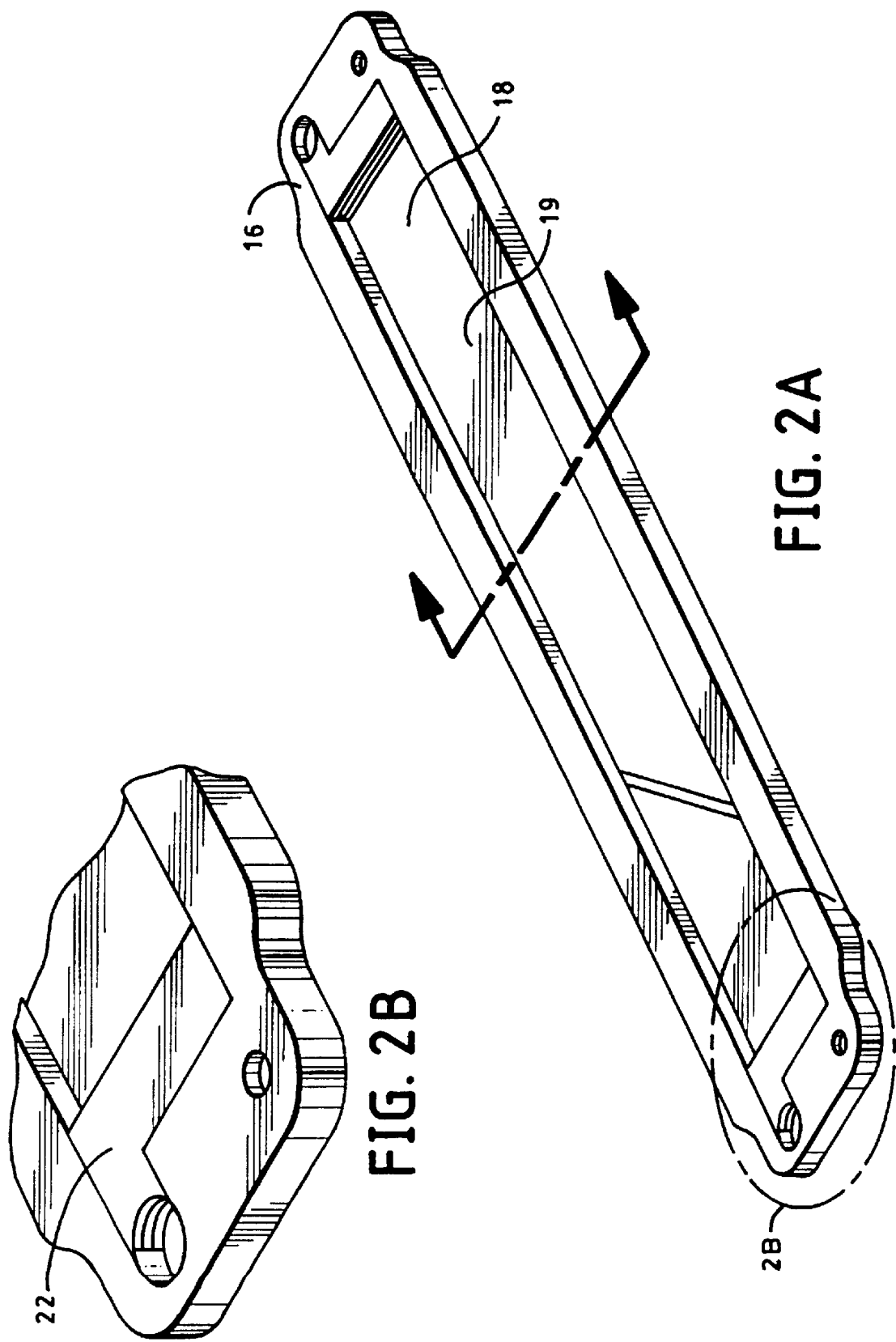
FIG. 2 is an elevation view of a spacer with a single membrane bonded thereto.

FIG. 2 provides a view of an electrodeionization spacer 16 that would receive a slurry brick. The brick would be inserted into the spacer channel 18, but only after a membrane 19 had been bonded to the spacer. The inset provides a view of the channel 22 in which the liquid traverses after passing through the media when the device is in operation.

Figure 3:
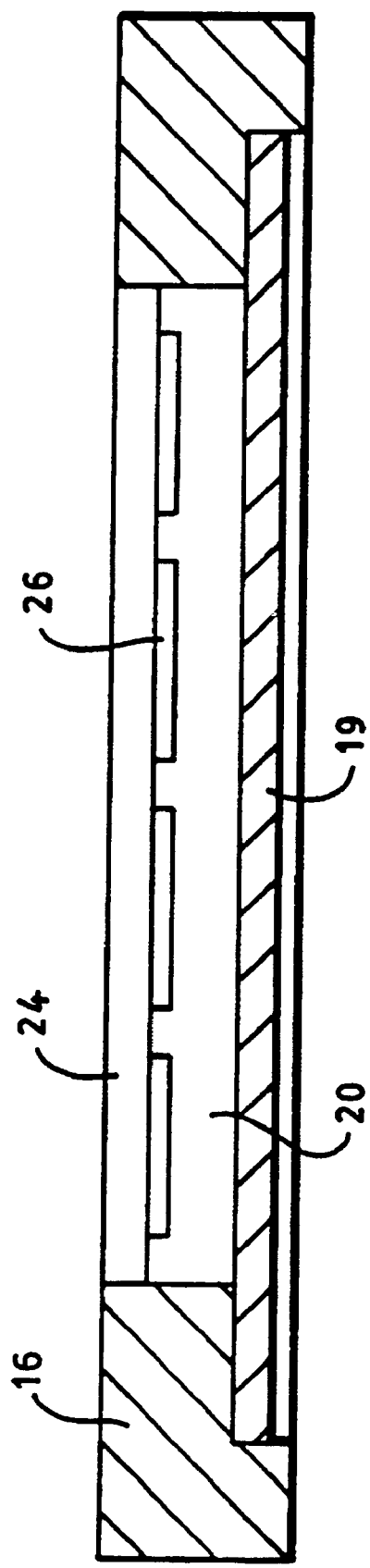
FIG. 3 is sectional view of the spacer of FIG. 2.

FIG. 3 provides a sectional view of the device in FIG. 2, wherein the spacer 16 has a membrane 19 between which is a cavity 20 in which resin is inserted. It further provides a retainer cap 24 that provides thin channels 26 that prevent the resin from entering the flow channel 22 of FIG. 3.

Figure 4:
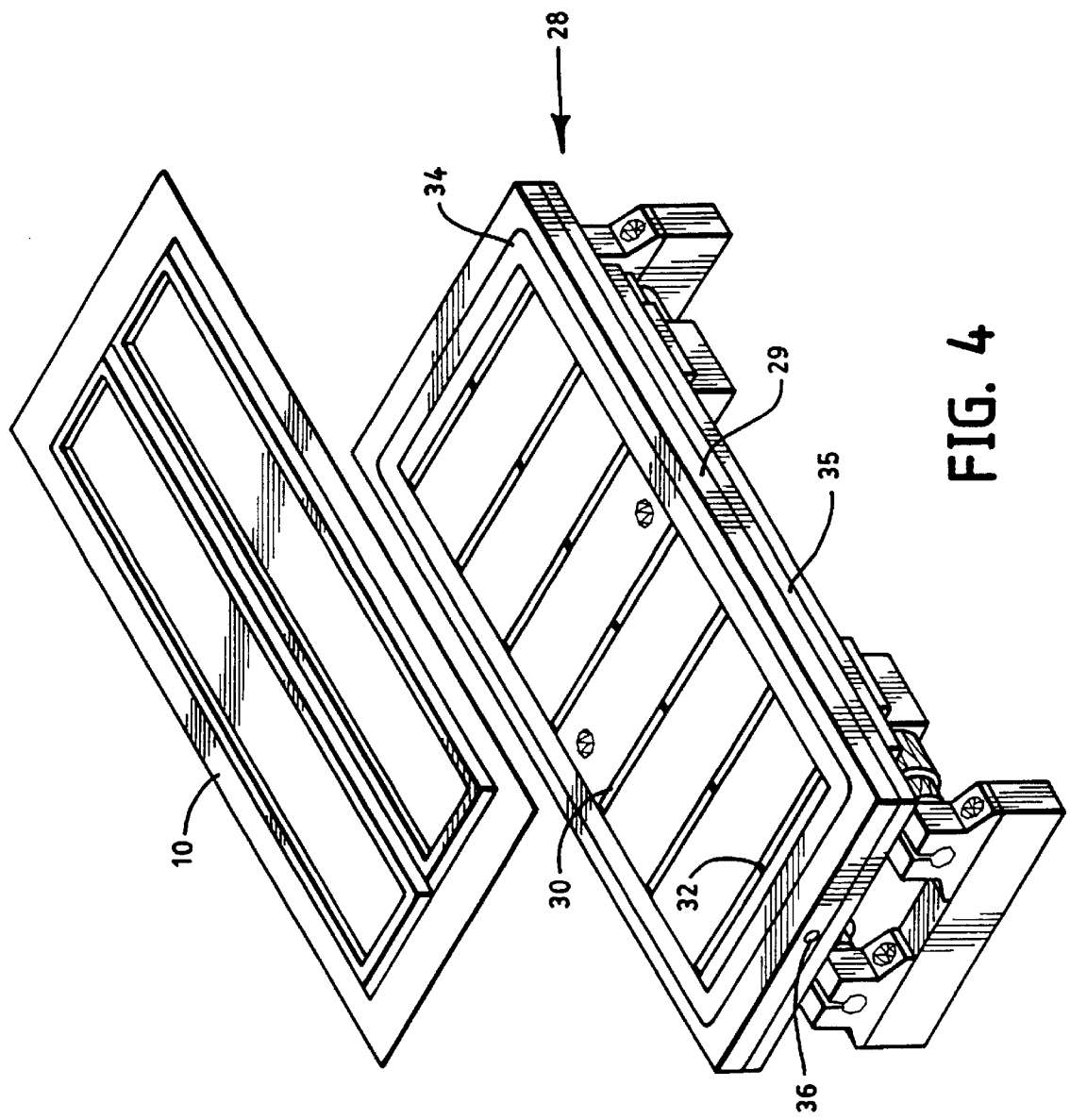
FIG. 4 illustrates a tray for freezing media that includes scoring on the bottom surface inside the tray.

FIG. 4 provides a view of a vibration table 28 on which a resin tray 10 may be vibrated so as to distribute evenly the ion exchange media. The tray 10 is fitted onto the table 28 such that the edge of the tray contacts the rubber vacuum seal 34. This is important as the vacuum needed to aspirate the excess water from the resin tray I 0 is piped into the table 28. The vacuum is provided via a vacuum channel 30 on the upper table portion 29 of the table 28. A vacuum port 32 is fluidly connected to a vacuum connection 36. This design of the table allows simultaneous aspiration of the water while the tray, and hence the media, is vibrated. The upper table portion 29 is fixed to a lower table portion 35.

Figure 5:
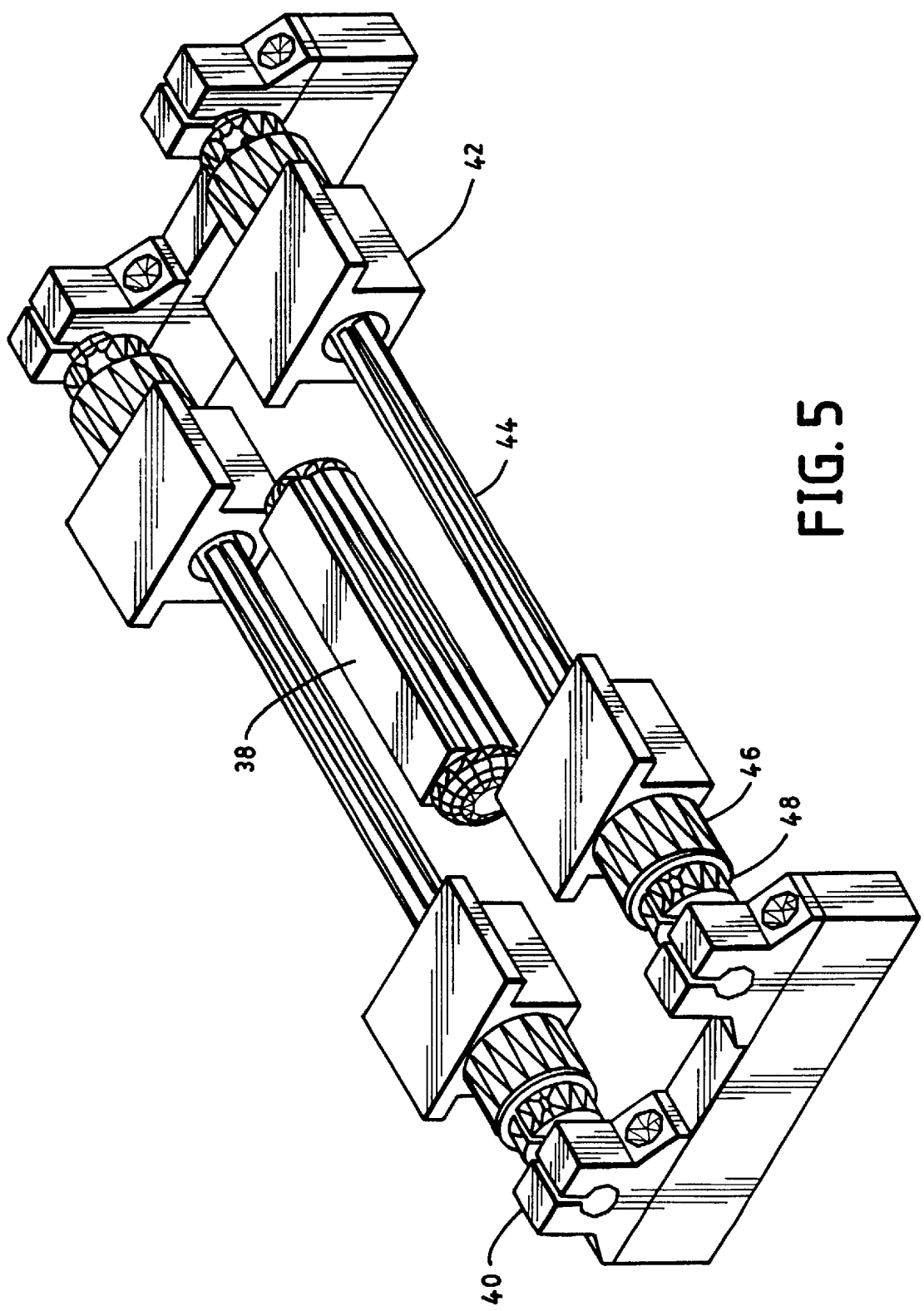
FIG. 5 illustrates the slurry brick-forming tray and a vibration table designed to receive such slurry brick-forming tray.

FIG. 5 provides a view of the support structure and the mechanism for vibrating the table 28. A vibrating cylinder 38 is fixed to the underside of the lower table portion 35 and the vibration forces it provides are transferred through the table 28 to the media. The vibrating cylinder was purchased from Branford Vibrator Company, located in Connecticut, USA. The movement created by the vibrational forces is controlled, but not suppressed, by fixing the lower table portion 35 to ball bushings 42 that are slidingly fixed to shaft rails 44. Such shaft rails 44 are supported by shaft support blocks 40. The ball bushings 42 move along the shaft rail 42 and thereby prevent side to side movement of the table 28. Rubber springs 46 and stop collars 48 restrict, but do not eliminate, the movement of the table along the plane of the shaft rails 44.

Figure 6:
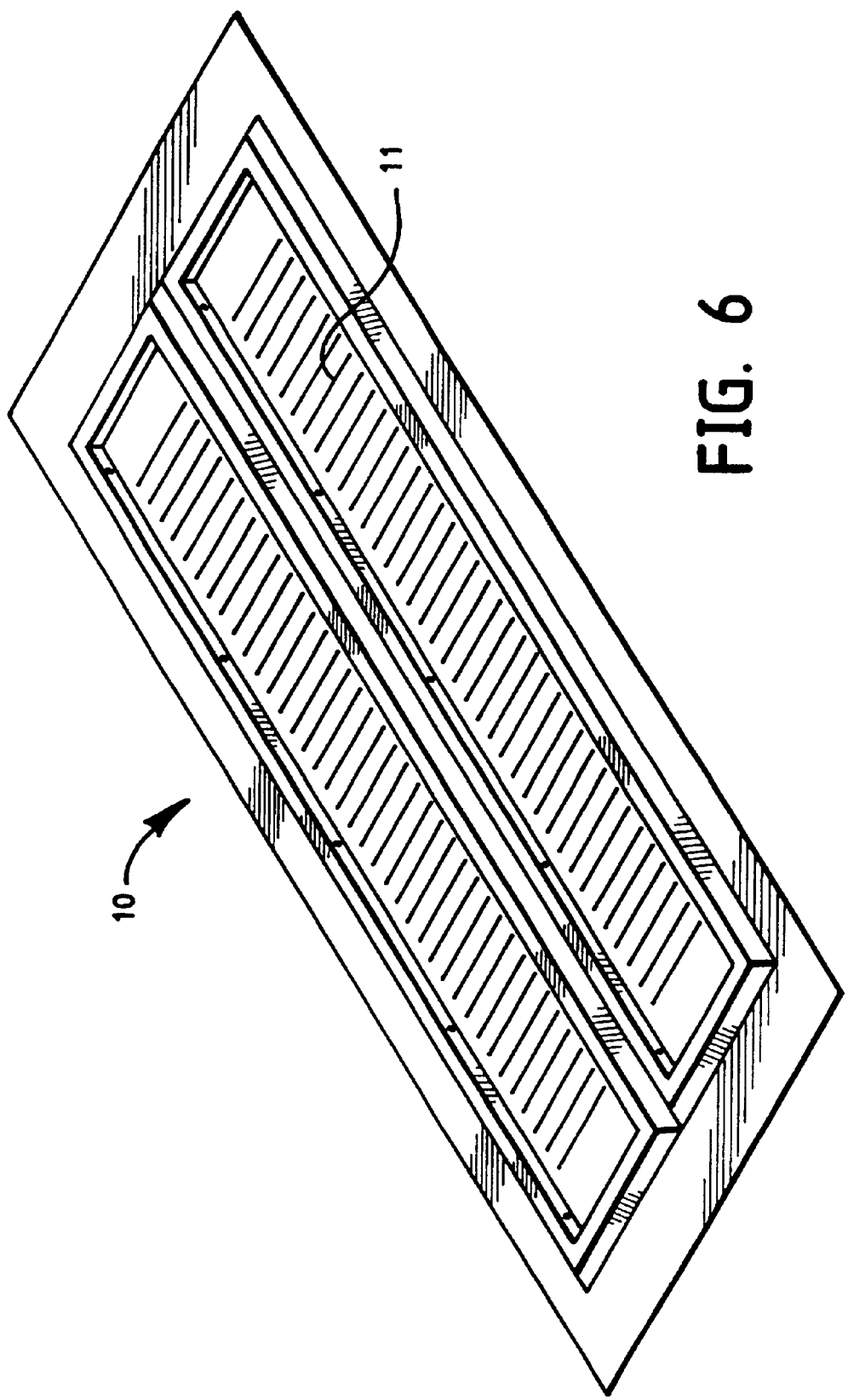
FIG. 6 illustrates a tray for freezing media that contains a grooved surface.

FIG. 6 provides a mold 10 with grooves 11 on the bottom of the mold 10 to facilitate ejection of the slurry brick from the mold 10.

A variety of printed publications have been cited in this application. All such publications are herein incorporated by reference in their entirety.

Although the invention has been described in detail above, this is solely for purposes of illustration and should not be considered limiting, as modifications may become apparent to those of skill in the art without departing from the scope of the invention as defined in the accompanying claims.

What is claimed is:

1. A method of preparing media for insertion into a compartment designed to receive such media, the method comprising:

selecting the desired media, wherein if the desired media is not packaged as a slurry, adding a sufficient amount of liquid to the media to create a slurry;

inserting the slurry into a means for forming the slurry into a predetermined shape, wherein the means, being a single device or a combination of devices, taken together are substantially equivalent to the shape of the compartment designed to receive the media, wherein the means for forming the slurry into a predetermined shape is an extruder; and freezing the liquid such that the media is entrapped therein and a slurry brick is created.

2. The method of claim 1, wherein the slurry is distributed with vibration before freezing.

3. A method of preparing media for insertion into a compartment designed to receive such media, the method comprising:

selecting the desired media, wherein if the desired media is not packaged as a slurry, adding a sufficient amount of liquid to the media to create a slurry;

inserting the slurry into a means for forming the slurry into a predetermined shape, wherein the means, being a single device or a combination of devices, taken together are substantially equivalent to the shape of the compartment designed to receive the media;

distributing the slurry throughout the means by vibration; and freezing the lquid such that the media is entrapped therein and a slurry brick is created.

4. The method of claim 3, wherein the slurry is vibrated about 0.01 to about 20 minutes.

5. The method of claim 3, wherein the slurry is vibrated about 0.05 to about 0.3 minutes.

6. The method of claim 3, wherein the slurry is vibrated about 0.08 minutes.

* * * * *

UNITED STATES PATENT AND TRADEMARK OFFICE
CERTIFICATE OF CORRECTION

PATENT NO. : 6,490,777 B1  Page 1 of 1
DATED : December 10, 2002
INVENTOR(S) : Andrew G. Proulx and George M. Carmichael It is certified that error appears in the above-identified patent and that said Letters Patent is hereby corrected as shown below:

<u>Title page,</u>
Item [75], Inventors, please change "George M. Carmichael" to -- George "H." Carmichael --.

Signed and Sealed this

Twenty-first Day of September, 2004

JON W. DUDAS
*Director of the United States Patent and Trademark Office*